US010582107B2

(12) United States Patent
Xu

(10) Patent No.: US 10,582,107 B2
(45) Date of Patent: Mar. 3, 2020

(54) SYSTEM AND METHOD FOR BULLET-TIME PHOTOGRAPHY

(71) Applicant: Shanghai Xiaoyi Technology Co., Ltd., Shanghai (CN)

(72) Inventor: Jie Xu, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/044,315

(22) Filed: Jul. 24, 2018

(65) Prior Publication Data
US 2018/0359407 A1     Dec. 13, 2018

Related U.S. Application Data

(63) Continuation of application No. 15/151,761, filed on May 11, 2016, now Pat. No. 10,051,170.

(30) Foreign Application Priority Data

Jan. 14, 2016 (CN) .......................... 2016 1 0024006

(51) Int. Cl.
  *H04N 5/232* (2006.01)
  *H04N 5/222* (2006.01)
  *H04N 5/225* (2006.01)
  *H04N 5/247* (2006.01)
  *H04N 5/262* (2006.01)

(52) U.S. Cl.
  CPC ......... *H04N 5/23203* (2013.01); *H04N 5/222* (2013.01); *H04N 5/2256* (2013.01); *H04N 5/247* (2013.01); *H04N 5/2621* (2013.01)

(58) Field of Classification Search
  CPC .. H04N 5/23203; H04N 5/2621; H04N 5/222; H04N 5/2256; H04N 5/247
  See application file for complete search history.

(56) References Cited

U.S. PATENT DOCUMENTS

| | | | |
|---|---|---|---|
| 6,052,539 A | 4/2000 | Latorre | |
| 9,001,226 B1 | 4/2015 | Ng et al. | |
| 10,051,170 B2 * | 8/2018 | Xu ..................... | H04N 5/23203 |
| 2001/0028399 A1 | 10/2001 | Conley | |
| 2003/0210461 A1 | 11/2003 | Ashizaki et al. | |
| 2005/0285875 A1 | 12/2005 | Kang et al. | |
| 2009/0175555 A1 | 7/2009 | Mahowald | |
| 2012/0092149 A1 | 4/2012 | Fujisawa | |
| 2012/0314089 A1 | 12/2012 | Chang et al. | |

OTHER PUBLICATIONS

Extended Search Report from the European Patent Office for European Patent Application No. 17151412.8, dated Mar. 10, 2017.

* cited by examiner

*Primary Examiner* — Gevell V Selby
(74) *Attorney, Agent, or Firm* — Cantor Colburn LLP

(57) ABSTRACT

Systems and methods for bullet-time photography are disclosed. According to certain embodiments, a method for bullet-time photography may include arranging a plurality of cameras around a subject of the bullet-time photography. The method may also include projecting a light beam from each of the plurality of cameras to the subject. The method may further include aligning an imaging direction of each of the plurality of cameras according to a direction of the respective light beam. The method may further include triggering the plurality of cameras to capture images of the subject.

18 Claims, 6 Drawing Sheets

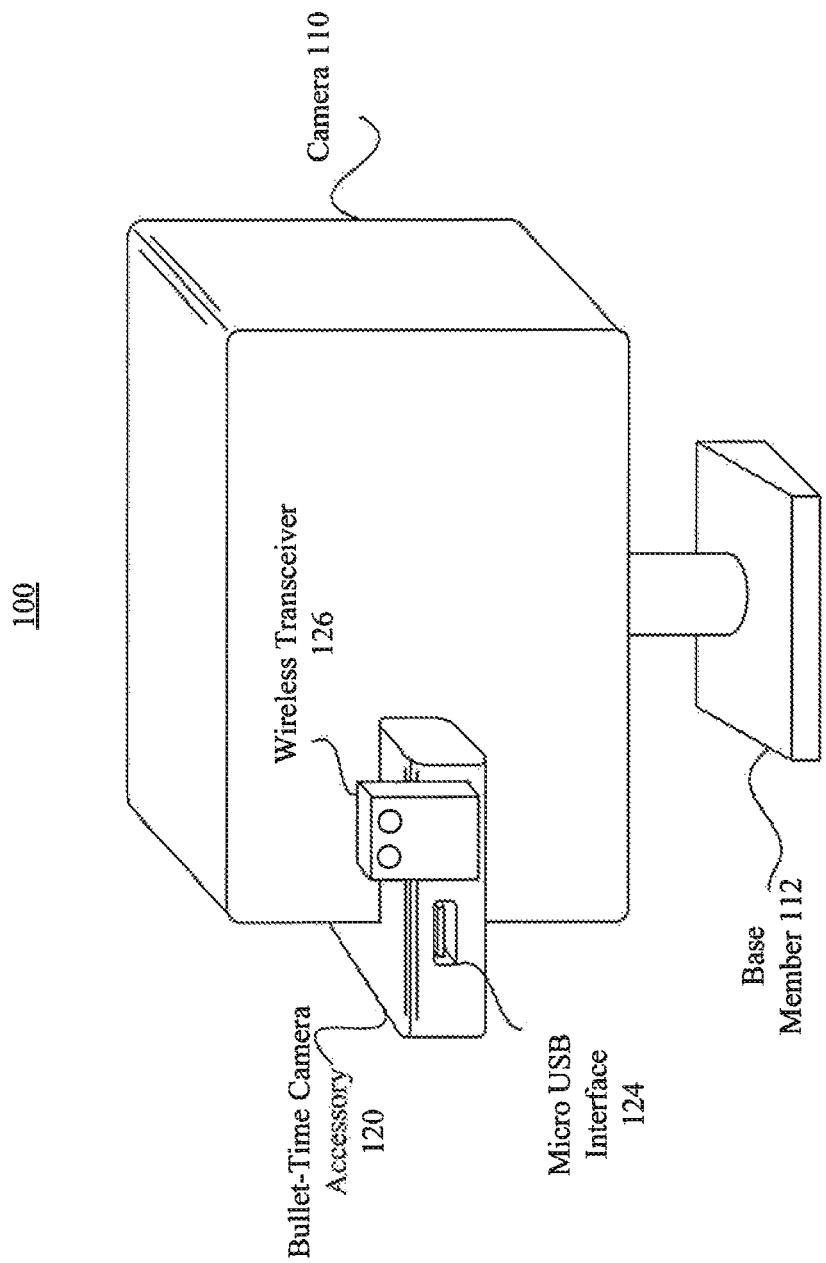

SYSTEM AND METHOD FOR BULLET-TIME PHOTOGRAPHY

CROSS-REFERENCE TO RELATED APPLICATIONS

This application is a continuation of U.S. patent application Ser. No. 15/151,761, filed May 11, 2016, which, is based upon and claims priority to Chinese Patent Application No. 201610024066.3 filed on Jan. 14, 2016, the entire contents of all of which are incorporated herein by reference.

TECHNICAL FIELD

The present disclosure relates generally to photography technologies, and more particularly, to a system and method for bullet-time photography.

BACKGROUND

"Bullet time," also known as "time slice" and "time freeze," is a visual effect of stopped time or slowed time. Bullet time is famous for being used in the movie series "the Matrix" to feature, for example, actors dodging bullets, and received its time because of these scenes. Bullet time is characterized both by its extreme transformation of time (slow enough to show normally imperceptible events, such as flying bullets) and space (by way of the ability of the camera angle, i.e., the audience's point-of-view, to move around the scene at a normal speed while events are lowed). Bullet time has been widely utilized in movies, commercials, video games, sports broadcasting, music videos, etc.

Bullet time can be achieved using a series of cameras, such as a camera array consisting of 25-150 cameras, surrounding the filmed subject. When the subject starts to make an action, the cameras are fired sequentially, or all at the same time, depending on the desired effect. The frames generated by each camera are then arranged and displayed consecutively to produce an orbiting viewpoint of an action frozen in time or in slow motion.

Despite all the fascination it has excited, bullet time is expensive and time-consuming to create. A typical bullet-time setup requires multiple cameras accurately lined up on a carefully designed rig. Both building the rig and installing the cameras cart be daunting tasks. Moreover, a lot of efforts need to be spent on interpolating frames (i.e., creating frames between frames) using a special software program to achieve the final effect. Therefore, "the Matrix" type of bullet time is teamwork by at least a software engineer, an imbedded-system engineer, photography director, a rig installation crew, and other assistants. The production periods may last from 24 hours to several weeks and the production cost can easily exceed 1 million dollars.

The disclosed methods and systems address one or more of the problems listed above.

SUMMARY

Consistent with one disclosed embodiment of the present disclosure, a method for bullet-time photography is provided. The method may include arranging a plurality of cameras around a subject of the bullet-time photography. The method may also include projecting a light beam from each of the plurality of cameras to the subject. The method may further include aligning an imaging direction of each of the plurality of cameras according to a direction of the respective light beam. The method may further include triggering the plurality of cameras to capture images of the subject.

Consistent with another disclosed embodiment of the present disclosure, a system for bullet-time photography is provided. The system may include a controller and a camera accessory attached to a camera. The camera accessory may include a light projector configured to project a light beam to a subject of the bullet-time photography. An imaging direction of the camera may be aligned according to a direction of the light beam. The controller may be configured to: control the light projector to project the light beam; and trigger the camera to capture images of the subject when the subject starts an action.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1B is a schematic diagram illustrating a back view of the exemplary camera assembly shown in FIG. 1A.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1A:
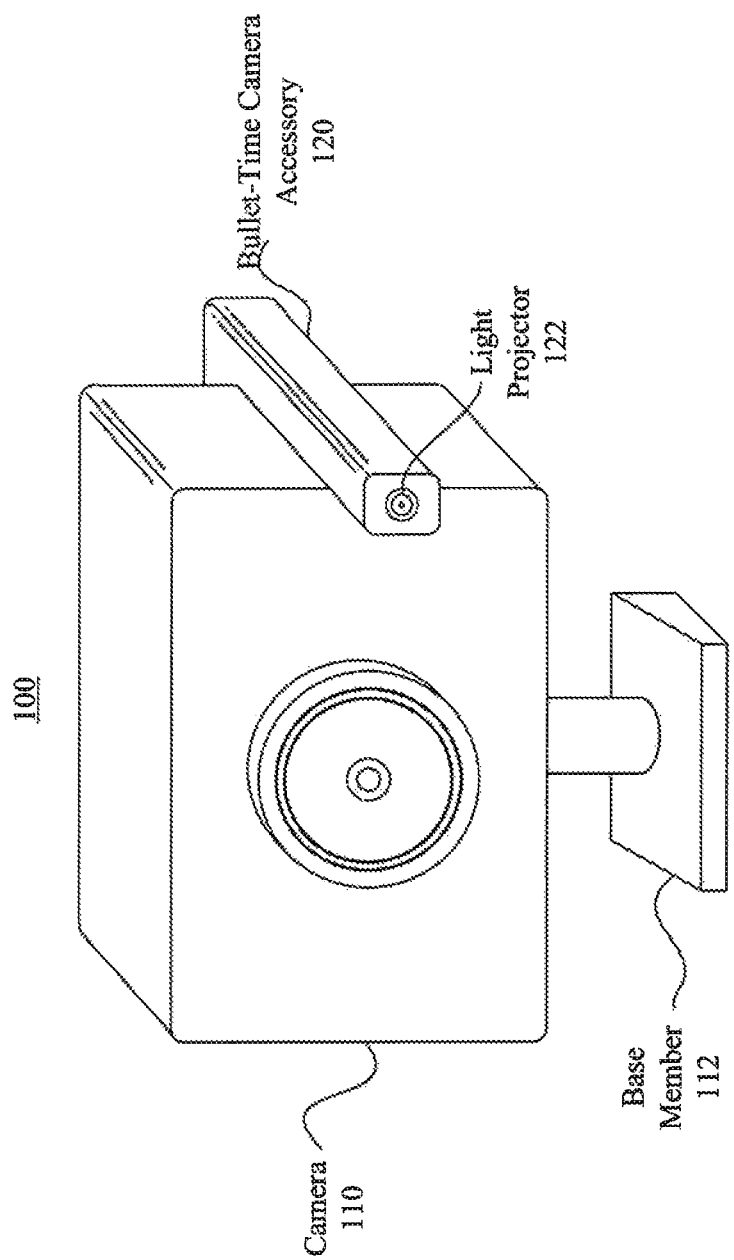
FIG. 1A is a schematic diagram illustrating a front view of a camera assembly for bullet-time photography, according to an exemplary embodiment.

FIG. 1A is a schematic diagram illustrating a front view of a camera assembly 100 for bullet-time photography, according to an exemplary embodiment. Referring to FIG. 1, camera assembly 100 may include a camera 110 and a bullet-time camera accessory 120.

Camera 110 may be any type of image capturing device. For example, camera 110 may be an action camera, a digital camera, a web camera. Camera 110 may also be imbedded in another device, such as a smartphone, a computer, a personal digital assistant (PDA), a monitoring device, a video gaming console, etc.

Camera 110 can be configured to capture one or more images in a variety of ways. For example, camera 110 can be configured to capture images by a user, by programming, by hardware setting, or by a combination thereof. In some embodiments, when camera 110 is configured to capture images by software or hardware programming or by hardware setting, image capturing can be performed at one or more predetermined conditions. For example, a set of predetermined conditions (for example, the sensing of an actor/actress starting an action) can trigger camera 110 to capture images. Alternatively, or additionally, camera 110 can capture images in response to a user's operation (for example, the use pushes a control button). In some embodiments, capturing images may include that camera 110 is in a mode or setting capable of capturing one or more images. As used herein, an "image" can refer to, in part or in whole, a static or dynamic visual representation including, but not limited to, a photo, a picture, a graphic, a video, a hologram, a virtual reality image, an augmented reality image, other visual representations, or combination thereof.

Camera 110 may be configured to form wireless or wired communications with other devices, including a controller that can remotely control the operation of camera 110 and a displaying device that can display the images taken by camera 110. For example, camera 110 may include a built-in Wi-Fi or Bluetooth module for wireless connection. Also for example, camera 110 may include a micro Universal Serial Bus (USB) interface by which other device may be connected to camera 110. For yet another example, camera 110 may include a High-Definition Multimedia Interface (HDMI) for outputting video and/or audio data to other devices.

With continued reference to FIG. 1A, camera 110 may include a base member 112 configured to mount camera 110 to a structure. In some exemplary embodiments, base member 112 may include one or more universal clips, cavities, or apertures designed for easy attachment to the structure. The structure may be a rig specially built for bullet-time photography. The structure may also be any common structures in a photography studio, such as the edge of a table, a door frame, etc. In some exemplary embodiments, base member 112 may also include one or more joints and/or gears configured to allow adjustment of the position and/or orientation of camera 110. Base member 112 may even include one or more electronic actuators and/or motors that can be controlled by a controller to change the position and/or orientation of camera 110. Base member 112 may be permanently or detachably secured to the bottom of camera 110. Although FIG. 1A shows base member 112 being directly attached to camera 110, it is contemplated that base member 112 may also be part of a separate case, such as a protective case or a waterproof case, that houses camera 110.

Still referring to FIG. 1A, bullet-time camera accessory 120 may be a device attached to camera 110 to facilitate the bullet-time photography. Bullet-time camera accessory 120 may include a power source, such as a battery, to supply power to each component of bullet-time camera accessory 120 and/or camera 110. Bullet-time camera accessory 120 may also include a charging port for connecting to an external charging device. In some exemplary embodiments, bullet-time camera accessory 120 may include a micro USB plug (not shown) configured to connect bullet-time camera accessory 120 to camera 110 via the micro USB interface on camera 110. In one embodiment, bullet-time camera accessory 120 may be attached on a side of camera 110 and may have an "L" shape, with the tail of the "L" shape extending to the back of camera 110.

The front end of bullet-time camera accessory 110 may be a light projector 122 configured to project a focused and collimated light beam on a subject of the bullet-time photography. The direction of the light beam may be configured to be parallel to the imaging direction of camera 110, For example, light projector 122 may be a laser pointer that includes a laser diode emitting a narrow coherent low-powered laser beam of visible light. As described in more detail below, the visible light may be used to form a small bright spot on the subject to facilitate the alignment of the imaging direction of camera 110.

FIG. 1B is a schematic diagram illustrating a back view of the camera assembly 100 shown in FIG. 1A. Referring to FIG. 1B, as described above, the tail of bullet-time camera accessory 120 may extend to the back of camera 110, and include a micro USB interface 124 and/or wireless transceiver 126.

Micro USB interface 124 may be similar to the micro USB interface on camera 110. Micro USB interface 124 may be configured to receive a cable for various purposes. Micro USB interface 124 may function as a charging port to receive a charging cable to charge bullet-time camera accessory 120. Micro USB interface 124 may also function as a data port to exchange data and signals with another device. For example, micro USB interface 124 may receive a data cable to transfer the images taken by camera 110 to another device, such as a computer, for further processing. For another example, micro USB interface 124 may be connected to a controller to receive control signals associated with bullet-time photography.

Wireless transceiver 126 may be an infrared signal transceiver, a near field communication (NFC) signal transceiver, a Bluetooth antenna, and/or a wireless router to facilitate short-range two-way communications between bullet-time camera accessory 120 and another device, such as a controller of camera 110. Similar to micro USB interface 124, wireless transceiver 126 may exchange data and signals with another device.

In exemplary embodiments, bullet-time camera accessory 120 may relay data and signals between camera 110 and other devices. That is, after bullet-time camera accessory 120 receives data and signals from other devices through micro USB interface 124 or wireless transceiver 126, bullet-time camera accessory 120 may transmit the received data and signals to camera 110. Similarly, bullet-time camera accessory 120 may also obtain data and signals from camera 110 and send them to other devices.

Figure 2:
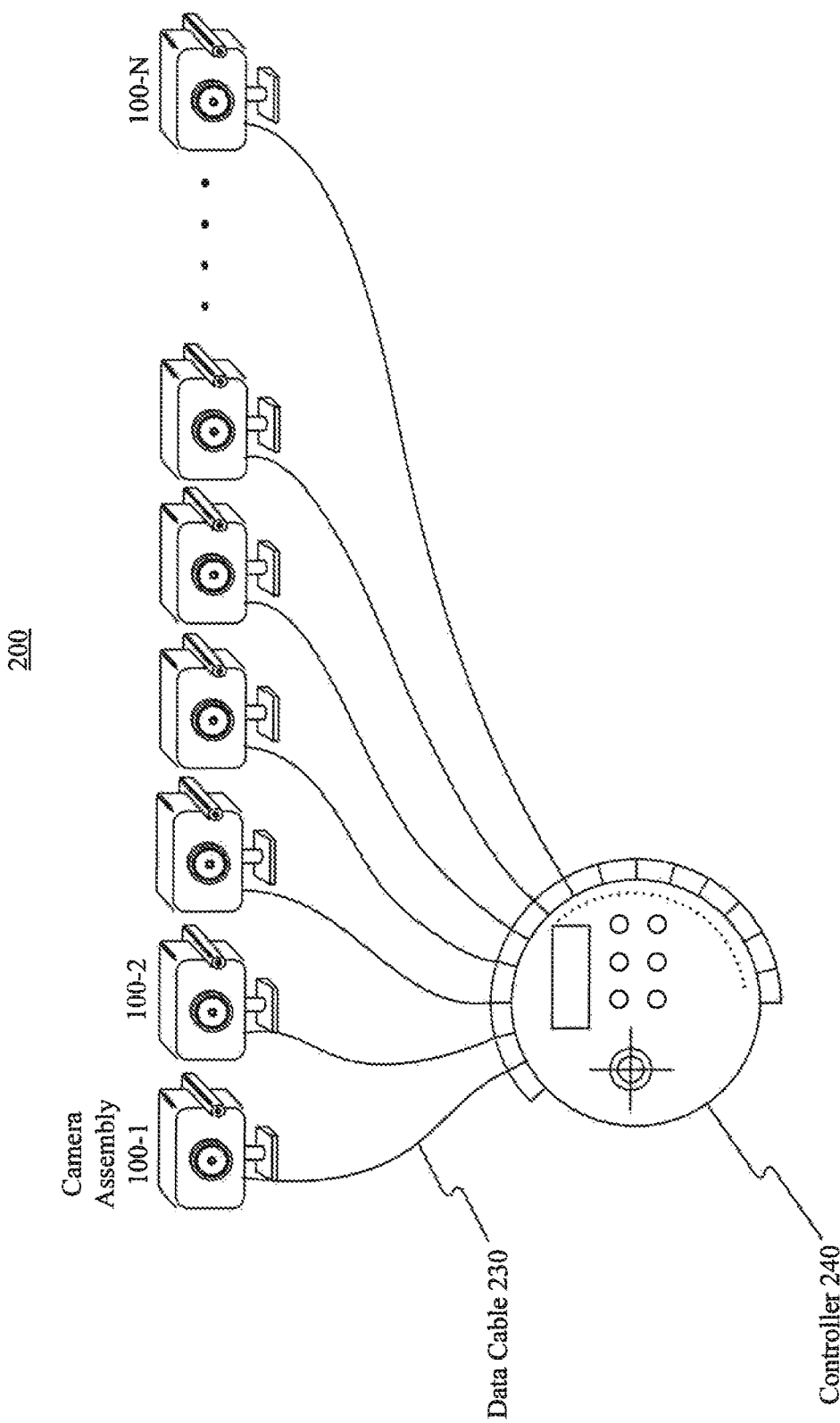
FIG. 2 is a schematic diagram illustrating a system for bullet-time photography, according to an exemplary embodiment.

FIG. 2 is a schematic diagram illustrating a system 200 for bullet-time photography, according to an exemplary embodiment. Referring to FIG. 2, system 200 may include a plurality of camera assemblies 100 (100-1, 100-2, . . . , 100-N) and a controller 240.

The plurality of camera assemblies 100 forms a camera array for bullet-time photography. The camera array may include any number of camera assemblies 100 and may be arranged in any configuration as needed. In the example illustrated in FIG. 2, the camera array may be mounted on a straight track (not shown), with each camera assemblies 100 being separated by an equal distance, for example, 10 cm.

Each camera assembly 100 may be connected to controller 240 using a data cable 230. Specifically, controller 240 may include a plurality of micro USB ports, such that each data cable 230 may connect micro USB interface 124 in each bullet-time camera accessory 120 with controller 240. This way, controller 240 may send control signals to each camera assembly 100 for performing the bullet-time photography related functions.

Alternatively, each camera assembly 100 may receive control signals from controller 240 through wireless transceiver 126. Correspondingly, controller 240 may include a wireless communication module configured to facilitate the wireless communications.

Controller 240 may be an independent device specially designed for bullet-time photography. Alternatively, controller 240 may be part of a larger device, such as a computer. Moreover, controller 240 may be implemented through hardware, software, or a combination of hardware and software. Referring to FIG. 2, in one exemplary embodiment, controller 240 may be a remote control that allows a camera operator to control the plurality of camera assemblies 100. For example, controller 240 may include a touchscreen, a touch pad, and/or a keyboard to enable user input.

To perform the bullet-time photography, the operator may push a power button on controller 240 to power and activate each camera assembly 100. The operator may then activate light projector 122 in each bullet-time camera accessory 120 to project a light beam to the subject of the time-bullet photography. Each light beam may form a light spot on the subject. The operator may adjust the orientation of each camera assembly 100 such that all the light spots converge to a position on the subject. In this manner, the imaging direction of each camera 110 may be aligned toward the same point.

The operator may input in controller 240 the camera parameters used for controlling the plurality of cameras 110. For example, the operator may enter the synchronization parameters for the plurality of cameras 110. The synchronization parameters may be used by controller 240 to trigger each camera 110 to take photos at the same time or sequentially. The operator may also set the exposure time (i.e., ISO), shutter speed, and aperture for each camera 110. After all the camera parameters have been set. The operator may use the controller 240 to control the plurality of cameras 110 to take photos of the subject.

Figure 3:
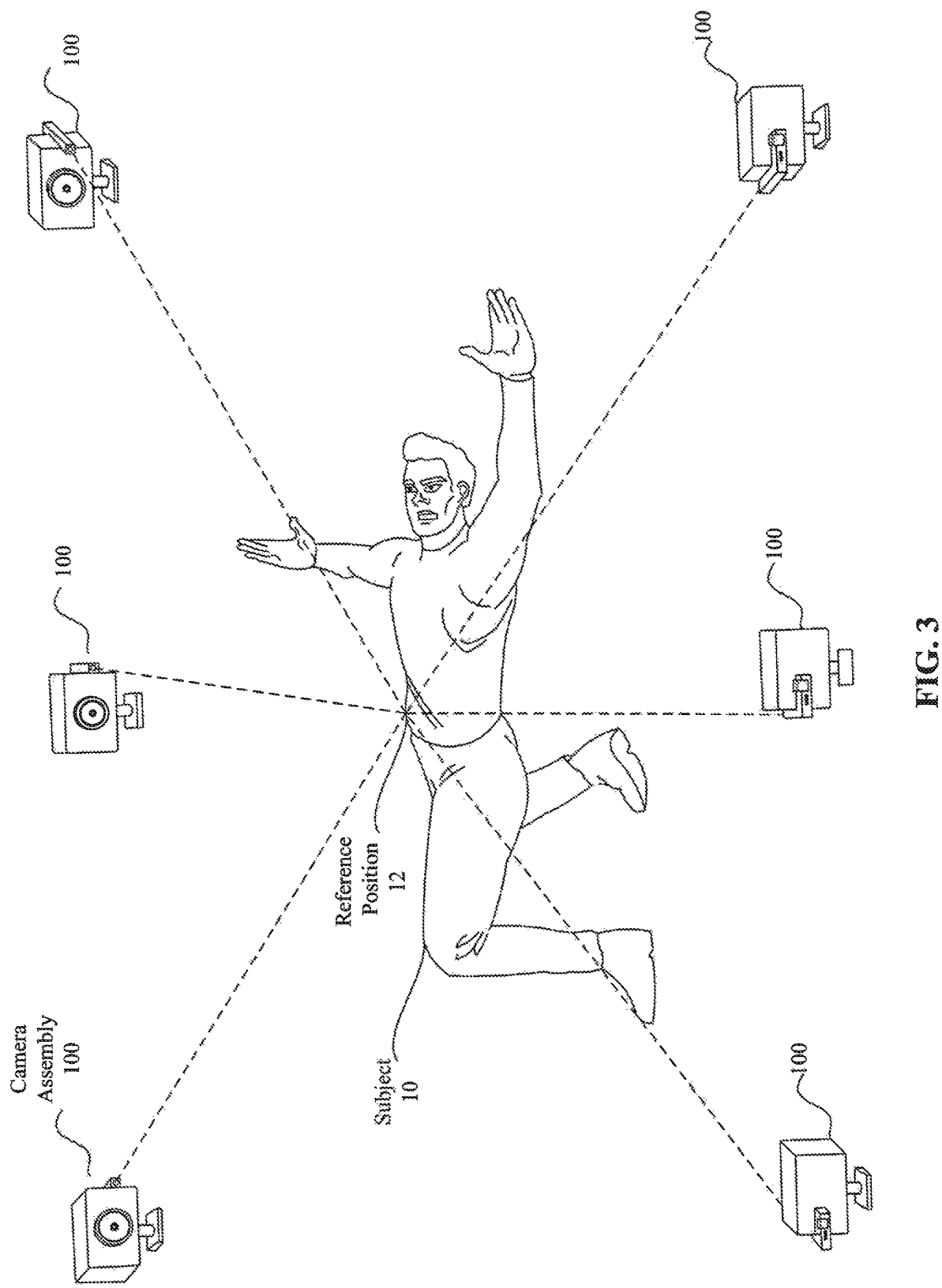
FIG. 3 is a schematic diagram illustrating an implementation of the system for bullet-time photography shown in FIG. 2, according to an exemplary embodiment.

FIG. 3 is a schematic diagram illustrating an implementation of the system 200 for bullet-time photography, according to an exemplary embodiment. The system 200 may be used to film the actions of a subject 10, such as a human actor/actress or an object. Referring to FIG. 3, a plurality of camera assemblies 100 may be mounted on a rig (not shown). The rig may be built to form a specially designed camera path. Industry standard trussing and grip gear can be used in conjunction with various custom rigging solutions to allow substantial flexibility with positioning, height, and camera movement. The rig may include multiple circles and curves with various diameters, straight tracks, incline/decline angles, overhead rigging, etc. However, consistent with the present disclosure, system 200 may only require a simple shaped rig, such as a single straight or curved track. For example, in a low-budget embodiment, the rig may be configured to allow the plurality of camera assemblies 100 to form a straight line, a 180° arc, or a 360° circle.

Upon the establishment of the rig, the plurality of camera assemblies 100 may be mounted to the rig through base members 112. Cameras 110 may be any types of cameras. In a low-budget embodiment, cameras 110 may be action cameras (also called sports cameras). Action cameras allow fast and continuous capture of the actions of a subject, and are suitable for both indoor and outdoor photography. Action cameras are typically compact, light-weight, and small sized, and are thus easy to be mounted on any structures. In a high-budget embodiment, cameras 110 may be digital single-lens reflex (DSLR) cameras typically used for film making.

After all the camera assemblies 100 are mounted on the rig, controller 240 may activate light projector 122 in each bullet-time camera accessory 120. As described above, controller 140 may send control signals to each bullet-time camera accessory 120 in a wired or a wireless manner (i.e., through micro USB interface 124 or wireless transceiver 126). Each bullet-time camera accessory 120 may then project a laser beam to subject 10. The direction of each laser beam is configured to be parallel to the imaging direction of the respective camera 110 (i.e., the axis of the lens in the respective camera 110). Each laser beam may form a crosshair on subject 10 to allow accurate alignment of cameras 110. In cases that subject 10 is far away from camera assemblies 100, light projector 122 may be configured to form a bright laser dot, instead of a crosshair, on subject 10 to provide better illumination of subject 10.

Various mechanisms may be provided to align the imaging direction of each camera 110 based on the laser beams generated by light projectors 122. In one embodiment, the operator may manually adjust each base member 112 to tune the imaging direction of the corresponding camera 110. Base members 112 may include any mechanical structures know in the art that allow the operator to adjust the orientations of cameras 110, such that all the laser beams point to a pre-chosen reference position 12 on subject 10. In another embodiment, base members 112 may be equipped with electronic actuators and/or motors so that the operator may preciously control the orientations of cameras 110 through controller 240 or another computer. For example, controller 240 or the computer may be configured to allow the operator to remotely control the orientation of each camera 110 separately or simultaneously.

After all cameras 110 are aligned in the desired imaging directions, system 200 may turn off light projectors 122 and start to shoot the footage. When subject 10 starts to make actions, controller 240 may trigger each camera 110 sequentially or simultaneously to take photos of subject 10. Controller 240 may also control other operation parameters of each camera 110, such as the aperture, the shutter speed, and the ISO. These parameters may be set by the operator before the shooting starts or adjusted by the operator during the shooting.

Figure 4:
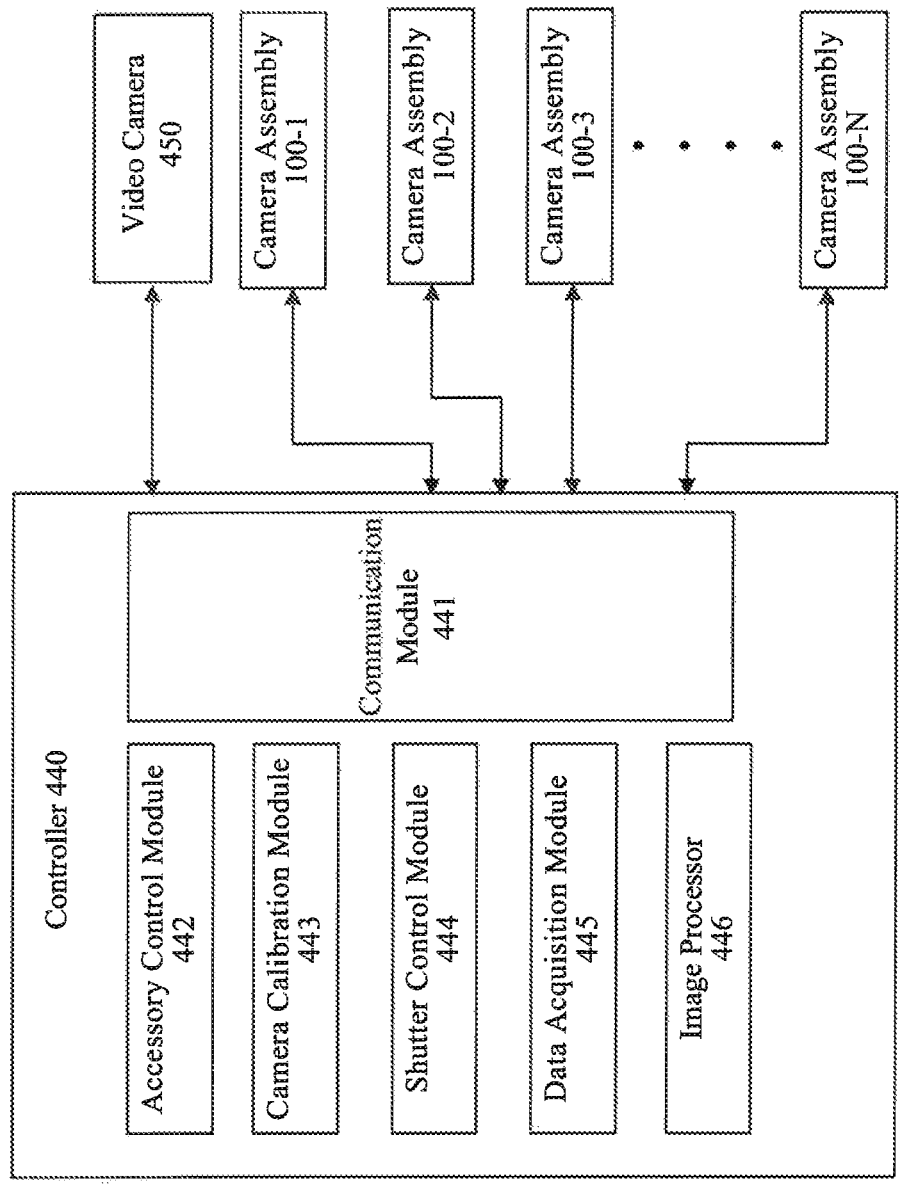
FIG. 4 is a block diagram of a system for bullet-time photography, according an exemplary embodiment.

FIG. 4 is a block diagram of a system 400 for bullet-time photography, according to an exemplary embodiment. Referring to FIG. 4, system 400 may include a plurality of camera assemblies 100, a controller 440, and one or more video cameras 450. Video cameras 450 may be used to shoot videos of subject 10, which may be combined with the photos taken by cameras 110 to produce the desired effects. Controller 440 may perform functions similar to controller 240. Controller 440 may further include a communication module 441, an accessory control module 442, a camera calibration module 443, a shutter control module 444, a data acquisition module 445, and an image processor 446.

Communication component 441 may be configured to facilitate communication, wired or wirelessly, between controller 440 and other devices, including camera assemblies 100 and video cameras 450. Communication module 441 may access a wireless network based on one or more communication standard, such as Wi-Fi, LTE, 2G, 3G, 4G, 5G, etc. In one exemplary embodiment, communication module 441 may further include a NFC module to facilitate short-range communications. In other embodiments, communication module 441 may be implemented based on a radio frequency identification (RFID) technology, an infrared data association (IrDA) technology, an ultra-wideband (UWB) technology, a Bluetooth (BT) technology, or other technologies. For example, communication module 441 may form Wi-Fi communications with each camera 110 and wireless infrared communications with each bullet-time camera accessory 120.

Accessory control module 442 may be configured to generate signals to control the operation of each bullet-time camera accessory 120. For example, accessory control module 442 may remotely turn on or turn off each light projector 122. Accessory control module 442 may also adjust the light intensity, light shape, and/or light color generated by each light projector 122.

Camera calibration module 443 may be configured to adjust the orientation and operation parameters of each camera 110. Camera calibration module 443 may remotely control the pan, tilt, zoom, focus, and iris of each camera 110. For example, camera calibration module 443 may control a servo motor in each base member 112 to adjust the imaging direction of the respective camera 110. In one embodiment, cameras 110 may take images of the areas on subject 10 that are illuminated by the plurality of light projectors 122 and transmit the images to camera calibration module 443. Based on the images, camera calibration module 443 may adjust the orientation of each camera 110 such that all the illuminated areas converge to reference position 12.

Shutter control module 444 may be configured to synchronize the shutter operation in each camera 110 during the footage shooting. Shutter control module 444 may trigger each camera 110 to capture the images of subject 10 simultaneously or in a specified sequence. Shutter control module 444 may also control the shutter speed of each camera 110 to achieve the desired effects.

Data acquisition module 445 may be configured to collect the footage generated by cameras 110 and video cameras 450. Data acquisition module 445 may also be configured to determine the metadata associated with the footage, such as the time and camera position at which the footage is shot, Data acquisition module 445 may supply the footage and the associated metadata to image processor 446 for further processing.

Image processor 446 may be configured to process the footage to generate the desired bullet-time effects. Image processor 446 may run any suitable software to process the footage. In one exemplary embodiment, image processor 446 may directly combine the desired sets of images based on the time when the images are taken. In another exemplary embodiment, image processors 446 may process the footage to interpolate between each camera 110 at one point in time with heavy frame-to-frame interpolation. Such treatment may ensure the bullet-time effect to be smooth and prevent image artifacts due to the spatial separation of cameras 110.

In exemplary embodiments, controller 440 may be implemented with one or more application-specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described functions.

In exemplary embodiments, controller 440 may also include a non-transitory computer-readable storage medium including instructions for performing above-described functions. For example, the non-transitory computer-readable storage medium may be a read-only memory (ROM), a random access memory (RAM), a CD-ROM, a magnetic tape, a memory chip (or integrated circuit), a hard disc, a floppy disc, an optical data storage device, or the like.

Figure 5:
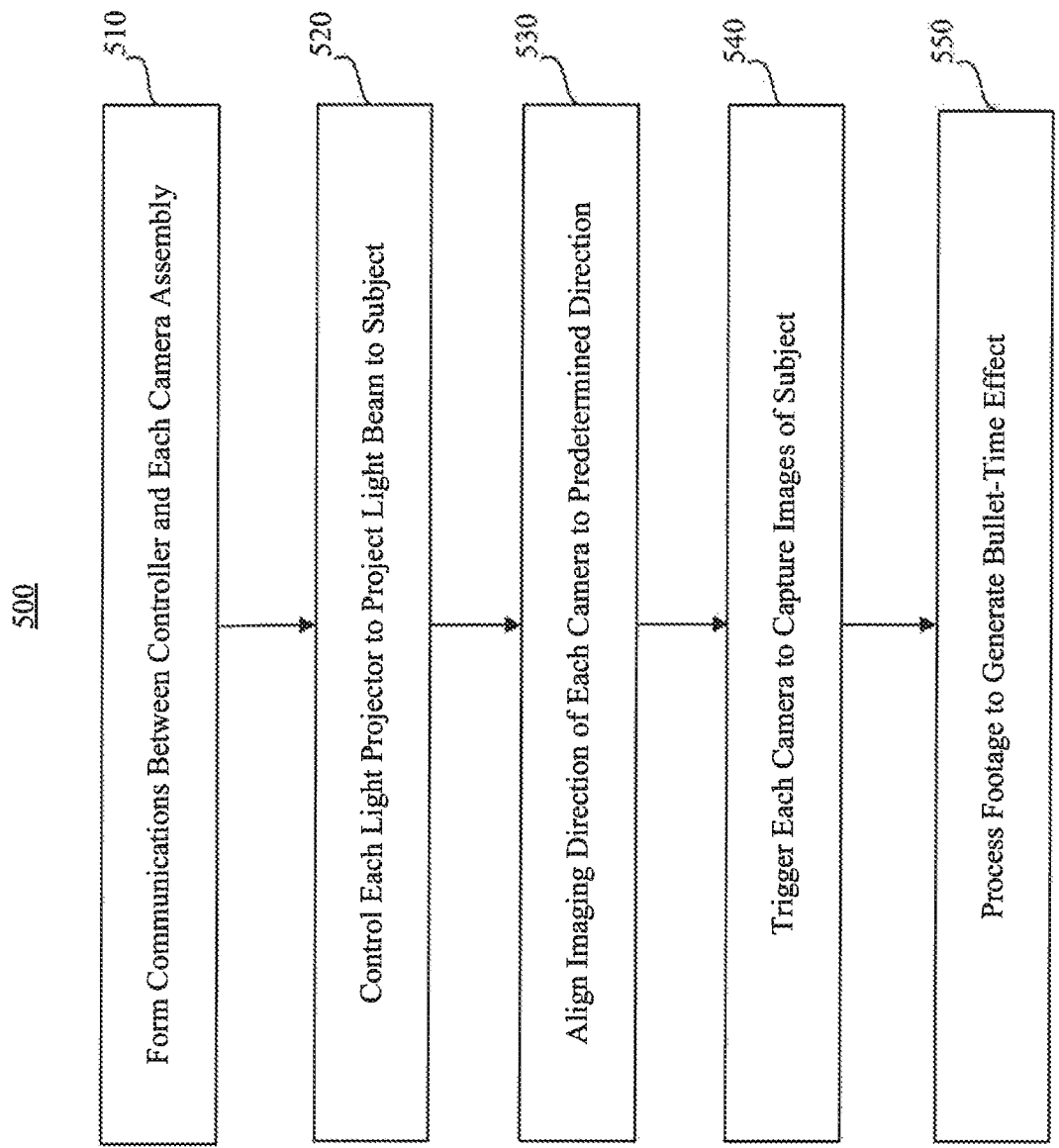
FIG. 5 is a flowchart of a method for bullet-time photography, according to an exemplary embodiment.

FIG. 5 is a flowchart of a method 500 for bullet-time photography, according to an exemplary embodiment. For example, method 500 may be used in system 400 (FIG. 4). Referring to FIG. 5, method 500 may include the following steps 510-550.

In step 510, controller 440 may form communications with each camera assembly 100. In one embodiment, controller 440 may form direct communication channels with cameras 110 and bullet-time camera accessories 120 separately. In another embodiment, controller 440 may form direct communication channels with bullet-time camera accessories 120 only and exchange data/signals with cameras 110 through bullet-time camera accessories 120.

In step 520, controller 440 may control each light projector 122 to project a light beam to subject 10. Controller 440 may send control signals to each bullet-time camera accessory 120 to turn on the corresponding light projector 122. In exemplary embodiments, light projectors 122 may be laser pointers that can generate focused and collimated laser beams.

In step 530, controller 440 may align the imaging direction of each camera 110 to a predetermined direction. The direction of the light beam generated by each light projector 122 is set parallel to the imaging direction f the corresponding camera 110. Controller 440 may adjust the orientation of each camera 110 such that all the light beams point to reference position 12. This way, the imaging direction of each camera 110 is aligned towards reference position 12.

In step 540, controller 440 triggers each camera 110 to capture images of subject 10. After the imaging directions of cameras 110 are aligned, controller 440 may turn off light projectors 122. When subject 10 starts an action, controller 440 may trigger each camera 110 simultaneously or in a specified sequence capture images of subject 10 from various positions. Controller 440 may control the shutter speed, ISO, aperture of each camera 110 to achieve desired result. Controller 440 may start the footage-shooting process in various manners. For example, an operator of system 400 may press a "start" button on a remote control to initiate the footage-shooting process. For another example, controller 440 may be connected to a sensor, such as a pressure sensor, configured to detect the action of subject 10. When the action starts, the sensor may generate a signal and transmit the signal to controller 440, which in turn fires cameras 110.

In step 550, controller 440 may process the footage to generate the bullet-time effect. Controller 440 may interpolate between each camera 110 at one point in time to generate extra frames, so as to improve the smoothness of the bullet-time effect. In some embodiments, controller 440 may also drop some frames to speed up the action.

The disclosed systems and methods provide a fast and cost-effective solution for time-bullet photography. In particular, the disclosed systems and methods minimize the requirement for rig design and construction. The light projectors provide easily observable guidance for aligning the imaging direction of each camera. Moreover, the base members enable the quick installment and alignment of the cameras. Therefore, not only the cameras may be mounted on any structures, but also the installation and alignment of the cameras may be accomplished by one person in a short time period. In addition, when budget-friendly cameras, such as action cameras, are used, the expenses for conducting the bullet-time photography may be further lowed. For example, in one implementation consistent with the disclosed embodiments, the bullet-time footage may be shot using 25 action cameras mounted on a straight track and separated from each other at a distance of 10 cm. This system may be set up in less than an hour and the budget may be controlled within a few thousand dollars.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact constructions that are described above and illustrated in the accompanying drawings, and that various modifications and changes can be made without departing from the scope thereof. It is intended that the scope of the invention should only be limited by the appended claims.

What is claimed is:

1. A method for controlling a plurality of camera assemblies to perform bullet-time photography, each camera assembly including a camera and a camera accessory attached to the camera, each of the cameras being communicatively coupled to the attached camera accessory, each of the camera accessories including an associated communication device to receive control signals and transmit data in the attached camera to another device, the method comprising:
controlling each of the camera accessories, by a control signal received by the associated communication device, to project a light beam, from an associated light projector to a subject of the bullet-time photography;
aligning an imaging direction of each of the cameras according to a direction of the light beam projected by the light projector of the attached camera accessory; and
triggering the cameras to capture images of the subject, wherein triggering comprises receiving, by the communication device associated with the camera accessory of the attached camera, a trigger signal.

2. The method according to claim 1, wherein the light beam is a collimated laser beam.

3. The method according to claim 1, wherein the imaging direction of each of the cameras is parallel to the direction of the respective light beam.

4. The method according to claim 1, wherein aligning the imaging direction of each of the cameras according to the direction of the respective light beam further comprises:
aligning an orientation of the camera assemblies such that the respective light beams point to a reference position on the subject.

5. The method according to claim 1, wherein triggering the cameras to capture the images of the subject further comprises:
triggering the cameras to capture the images of the subject simultaneously.

6. The method according to claim 1, wherein triggering the cameras to capture the images of the subject further comprises:
triggering the cameras to capture the images of the subject sequentially.

7. The method according to claim 1, wherein triggering the cameras to capture the images of the subject further comprises:
before the images of the subject are captured, setting an operation parameter for each of the cameras.

8. The method according to claim 7, wherein the operation parameter is at least one of a shutter speed, an ISO, or an aperture of the respective camera.

9. A system for bullet-time photography, comprising:
a camera accessory attached to, and communicatively coupled to a camera, to perform bullet-time photography, the camera accessory including an associated communication device, the camera accessory configured to:
receive control signals via the communication device;
transmit data in the attached camera to another device via the communication device;
project a light beam from an associated light projector to a subject of bullet-time photography based on to the received control signals;
align an imaging direction of the camera according to a direction of the light beam projected by the light projector of the attached camera accessory; and
trigger the camera to capture images of the subject, wherein triggering comprises receiving, by the communication device associated with the camera accessory of the attached camera, a trigger signal.

10. The system according to claim 9, wherein the light projector is a laser pointer configured to generate a collimated laser beam.

11. The system according to claim 9, wherein the direction of the light beam is parallel to the imaging direction of the camera.

12. The system according to claim 9, wherein the camera accessory is further configured to align an orientation of the camera such that the light beam projected by the light projector points to a reference position on the subject.

13. The system according to claim 9, wherein the communication device further comprises a Universal Serial Bus (USB) interface.

14. The system according to claim 9, wherein the communication device further comprises a wireless transceiver.

15. The system according to claim 9, further comprising:
a base member attached to the camera, the base member configured to allow adjustment of an orientation of the camera.

16. The system according to claim 9, wherein the camera accessory is further configured to control an operation parameter of the camera.

17. The system according to claim 16, wherein the operation parameter is at least one of a shutter speed, an ISO, or an aperture of the camera.

18. A system for bullet-time photography, comprising:
a camera;
a camera accessory attached to, and communicatively coupled to a camera, to perform bullet-time photography, the camera accessory including an associated communication device, with the camera accessory configured to:
receive control signals via the communication device;
transmit data in the attached camera to another device via the communication device;
project a light beam from an associated light projector to a subject of bullet-time photography subject to the received control signals;

align an imaging direction of the camera according to a direction of the light beam projected by the light projector of the attached camera accessory; and trigger the camera to capture images of the subject, wherein triggering comprises receiving, by the communication device associated with the camera accessory of the attached camera, a trigger signal.

* * * * *